No. 690,447. Patented Jan. 7, 1902.
D. LYNN.
MACHINE FOR CUTTING TENONS.
(Application filed Jan. 9, 1899.)

(No Model.) 2 Sheets—Sheet 1.

Witnesses
J. G. Hinkel
G. J. May.

Inventor
David Lynn
by
Burton Macafee
Attorney

No. 690,447. Patented Jan. 7, 1902.
D. LYNN.
MACHINE FOR CUTTING TENONS.
(Application filed Jan. 9, 1899.)
(No Model.) 2 Sheets—Sheet 2.

Witnesses
J. G. Hinkel
M. J. May

Inventor
David Lynn
by
Burton Macafee
Attorney

UNITED STATES PATENT OFFICE.

DAVID LYNN, OF ATHENS, PENNSYLVANIA.

MACHINE FOR CUTTING TENONS.

SPECIFICATION forming part of Letters Patent No. 690,447, dated January 7, 1902.

Application filed January 9, 1899. Serial No. 701,622. (No model.)

*To all whom it may concern:*

Be it known that I, DAVID LYNN, a citizen of the United States, residing at Athens, in the county of Bradford and State of Pennsylvania, have invented certain new and useful Improvements in Machines for Cutting Tenons, of which the following is a specification.

My invention relates to improvements in machines for cutting tenons, particularly dovetail tenons, in material to be worked up into furniture, boxes, or other articles.

Figure 1:
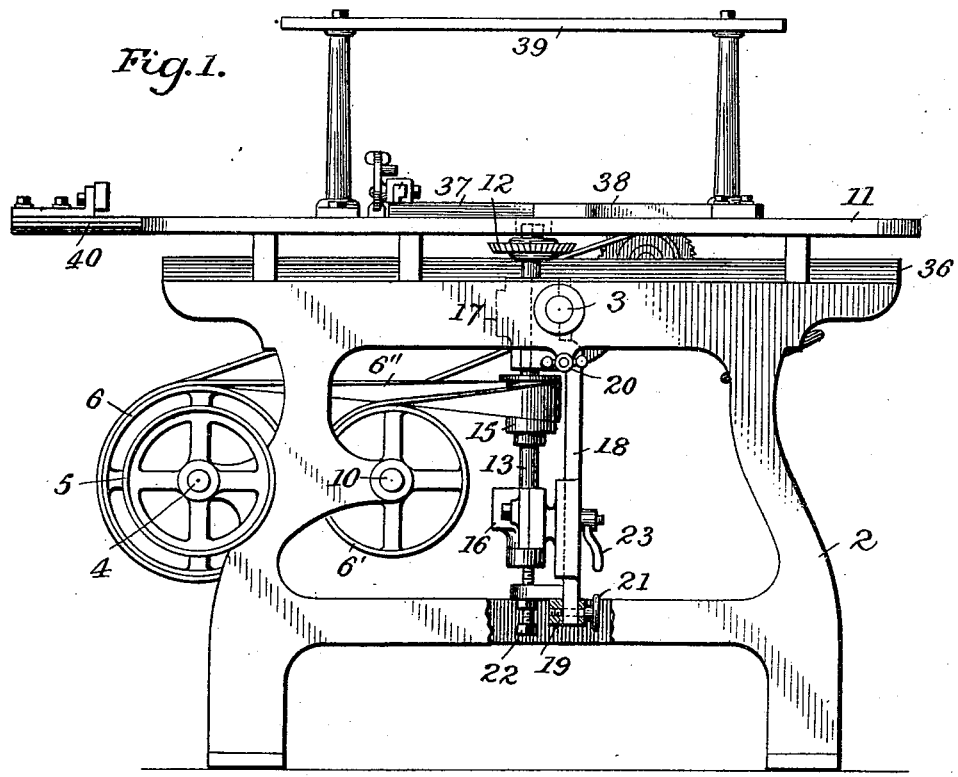
Figure 2:
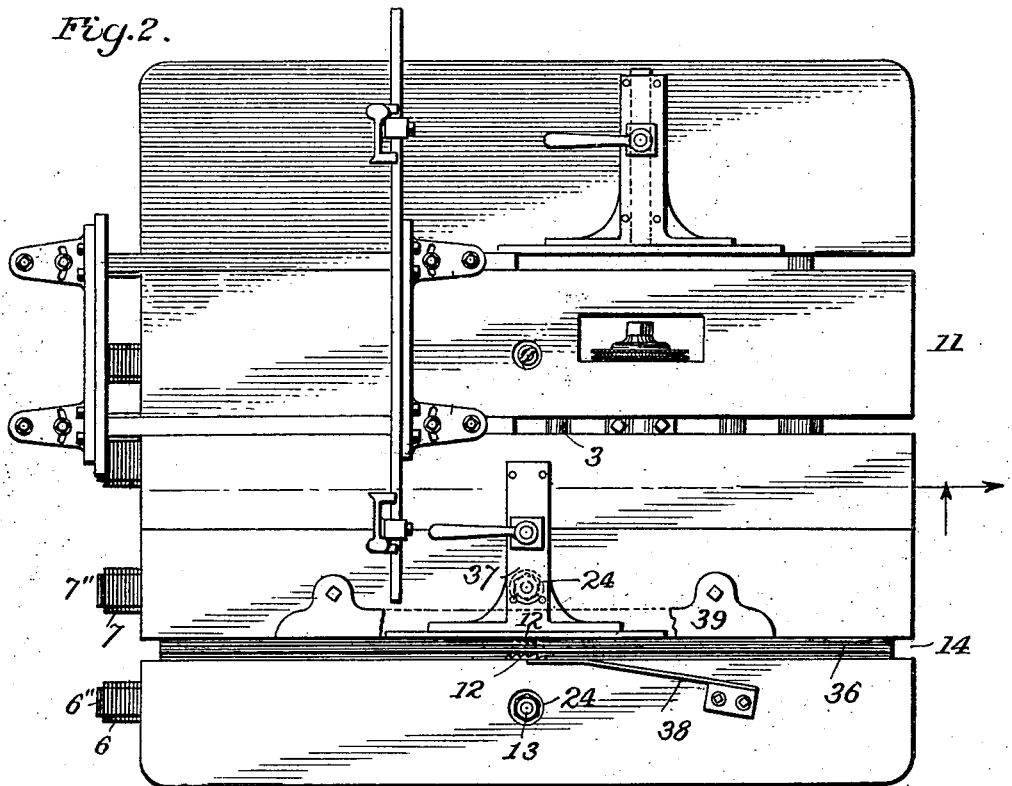
Figure 3:
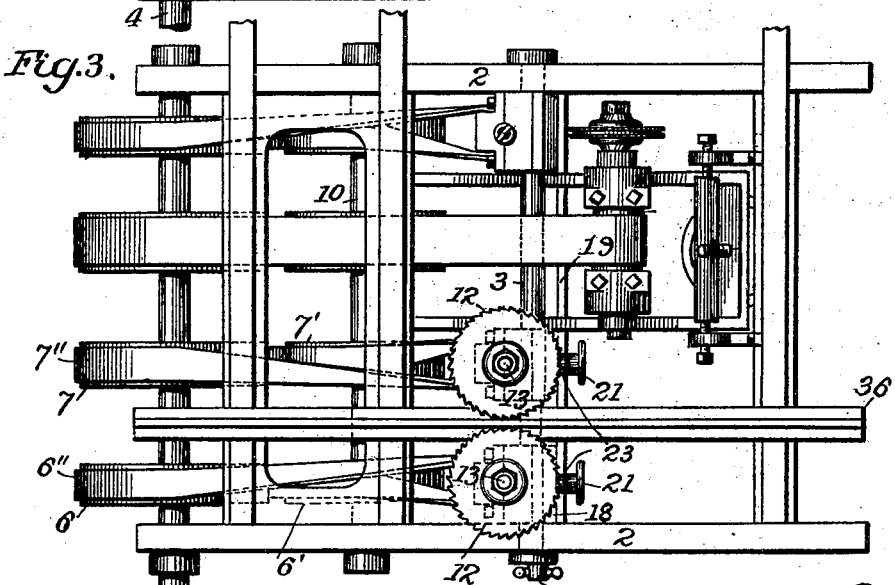

Figure 1 is a side elevation, a portion of the frame being broken away, of a machine embodying my invention. Fig. 2 is a top plan view of the machine, the work-table being in place; and Fig. 3 is a similar view, the work-table being removed.

In the drawings, 2 2 represent the main frame-pieces of the machine, in which are mounted the various operative parts of the apparatus.

3 is a cross shaft or bar uniting the side frame-pieces and serving to support parts of the machine to be hereinafter referred to.

4 represents the main driving-shaft, supported near one end of the machine and provided with fast and loose pulleys 5 to receive a belt from any suitable motor. Upon this shaft there are mounted a series of belt-pulleys 6 and 7, around which pass the belts that drive the several cutting-tools to be described.

10 designates a shaft parallel to the shaft 4 and carrying a series of idler or belt-tightener pulleys 6' and 7', arranged, respectively, in the vertical longitudinal planes of the pulleys on the driving-shaft.

11 represents the top or table of the machine, in grooves in the face of which the work is supported while being operated upon by the cutting-tools. The top is removable from the framework of the machine to expose and render easily accessible the mechanism and tools of the apparatus and is preferably supported a little above the top edges of the frame-pieces 2, as represented in Fig. 1, to give ample space for the various adjustments required to suit different kinds of work.

12 12 are saws mounted upon vertically-arranged shafts 13 and so disposed that they cut the male dovetail or tenon along the edge of a piece of material. These saws are arranged between the upper edges of the frame-pieces 2 and the table 11 and are situated upon opposite sides of a groove 14 in the table, in which groove the piece of material travels while being operated upon by the saws 12. The saw-shafts 13 are provided with belt-pulleys 15, with which the belts 6" and 7", driven from the pulleys 6 and 7, respectively, engage. These belts are quarter-turned, as is represented in the drawings, and the pulleys 6' and 7' keep them tight. The saws 12 are adjustable transversely—that is, toward and from each other—in order that they may be accommodated to material of different thicknesses, and are also adjustable vertically, that the size of the tenon may be varied. To secure these adjustments, I preferably mount the shafts or arbors for the saws in the following manner:

16 and 17 are respectively the lower and the upper bearings or boxes in which the shafts 13 rotate. They are secured to or carried by the transversely-adjustable carriers 18, and these in turn are connected near their upper ends with the shaft or connecting-bar 3 of the framework, by which they are supported and along which they may be adjusted. The lower ends of the carriers 18 are supported by the cross frame piece or pieces 19.

20 is an adjusting screw or shaft mounted in the framework and connected with the carriers 18. I preferably use but a single adjusting-shaft and connect it with both of the carriers, so that the saws may be simultaneously adjusted toward or away from each other, as occasion may require; but an adjusting device for each carrier might be used.

21 21 indicate binding or set screws by which the carriers may be securely held after they have been transversely adjusted.

Each saw 12 and its shaft is vertically adjusted by means of a screw 22, and the lower bearing or box 16 for the shaft is arranged to move vertically with its shaft whenever adjusted, a binding or set screw 23, passing through a slot in the carrier 18 and engaging with the bearing 16, serving to securely hold the parts after such adjustment has taken place.

In the form of machine illustrated in the drawings the saws 12 are formed with beveled cutting edges, and the two saws are so situated relative to each other that they cut a dovetail-shaped tenon along the edge of the board or material being operated upon. It will be readily understood that the size of the tenons cut by the saws 12 may be varied by simply adjusting the positions of the saws, both laterally toward and from each other and in the direction of their axes, without necessitating a change of the saws upon the shafts 13.

24 24 are apertures in the table 11 opposite the ends of the shafts 13 and into which in practice the shafts extend. They permit ready access being had to the nuts or other means by which the saws are secured to their shafts, so that the saws may be easily removed and replaced as occasion may require.

In order that the work or materials being operated upon may be satisfactorily and steadily presented to the tools, various accessory devices are combined with a machine such as I have described.

36 represents a support for the material to be operated upon by the saws 12 while cutting the tenon. It is arranged directly below the groove or slot 14 in the table and below the horizontal plane of the saws 12, and the lower edge of the material being operated upon rests thereon.

37 represents a sliding or adjustable gage adapted to be secured to the top of the table adjacent to the slot 14 and against which gage one face of the material being operated upon by the saws 12 is held during the cutting of the tenon, the edge of the material at the same time resting upon the support 36 therefor, such support, as before stated, being arranged below the slot 14 in the table and the working plane of the saws 12. A spring 39 is arranged opposite to the gage 37 and forces the material firmly against the latter. When a large piece of material is being operated upon, a gage 39 is employed. This latter gage stands some distance—a foot, more or less—above the table and serves to prevent the material from tipping while the tenon is being cut.

I have represented means for cutting a dovetail groove as being supported by the same framework as that which supports the mechanism herein described and claimed; but such groove-cutting mechanism forms no part of the invention herein claimed.

What I claim, and desire to secure by Letters Patent, is—

1. In a tenon-cutting machine, the combination of the frame-pieces, a top or table, 11, supported above the upper edges of the frame-pieces, and provided with a longitudinal groove, 14, a support, 36, below the groove, horizontally-arranged tenon-cutting saws mounted upon either side of the said groove in the table, and between the table and the top of the frame-pieces, and means for driving the saws, substantially as set forth.

2. The combination of the supporting-frame, a top or table in which is formed a longitudinal groove, a support below the groove for the material, and tenon-cutting tools arranged between the table and the said support, substantially as set forth.

3. In a tenon-cutting machine, the combination of a pair of bevel-edged tenon-cutting saws arranged edge to edge, a support below and between said saws, means for adjusting the saws vertically relative to the support, and means for adjusting the saws toward and from each other, substantially as set forth.

4. The combination, in a machine for cutting tenons, of the saws, 12, arranged in the same plane, means below the plane of the saws for supporting the material on edge between the saws while being operated upon thereby, means for adjusting the saws in the direction of their axes of rotation, and means for adjusting the saws toward and from each other, whereby the size of the tenons which they cut may be varied, substantially as set forth.

5. The combination of a framework, the tenon-cutting saws, 12, having beveled cutting edges, the vertical shafts upon which the saws are mounted, the bearings in which the shafts turn, means for adjusting the said shafts in their bearings axially, the carriers for such shaft-bearings, and the means for transversely adjusting the said carriers, and driving mechanism for the saws, substantially as set forth.

6. The combination of a work top or table having therein a longitudinal slot 14, a pair of tenon-cutting saws arranged below the said top or table on either side of the said slot, and in a plane substantially parallel thereto, means arranged below the saws for supporting the material on edge, means for supporting the material on one side or face near the face of the top or table, and means for supporting the material on one side or face at a distance considerably above the face of the top or table, substantially as set forth.

DAVID LYNN.

Witnesses:
ROBERT J. PURCELL,
JOSEPH M. ELY.